United States Patent
Sterrett

[15] 3,675,394
[45] July 11, 1972

[54] GAS SEPARATING DEVICE

[72] Inventor: Eugene L. Sterrett, 2835 Leticia Drive, Hacienda Heights, Calif. 91745

[22] Filed: June 18, 1970

[21] Appl. No.: 47,230

[52] U.S. Cl. .................................................. 55/518, 55/515
[51] Int. Cl. ................................. B01d 39/02, B01d 46/30
[58] Field of Search ............................................. 55/518, 515

[56] References Cited

UNITED STATES PATENTS 3,330,101   7/1967   Murphy, Jr. .......................... 55/518 X

*Primary Examiner*—Howard R. Caine
*Attorney*—William P. Green

[57] ABSTRACT

A device for separating one or more selected gases from a stream of air or another gas, said device including a cellular honeycomb type structure having a large number of compartments or cells partially filled with a granular gas removing substance, with the granular material being retained in the cells by screening disposed across opposite ends thereof.

17 Claims, 9 Drawing Figures

PATENTED JUL 11 1972 3,675,394

EUGENE L. STERRETT
INVENTOR.

BY William P. Green
ATTORNEY

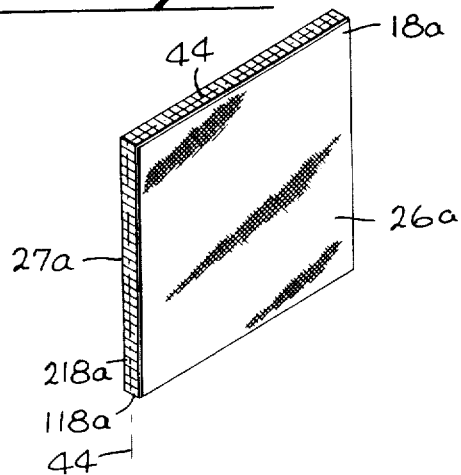
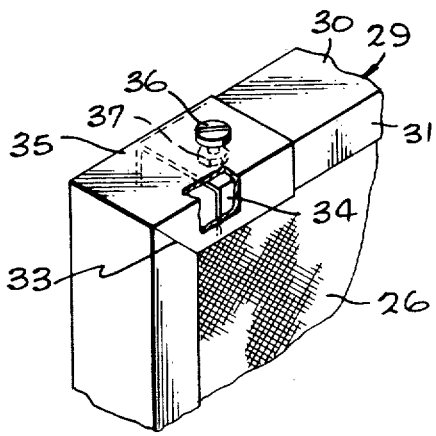
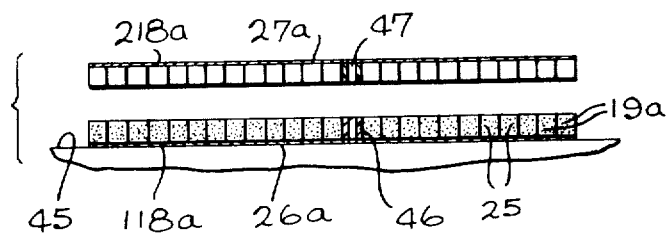
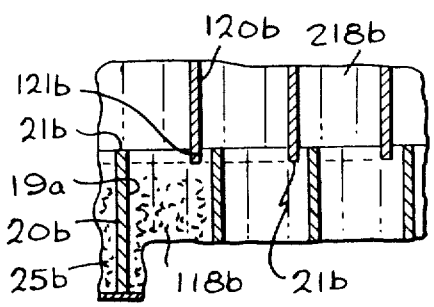
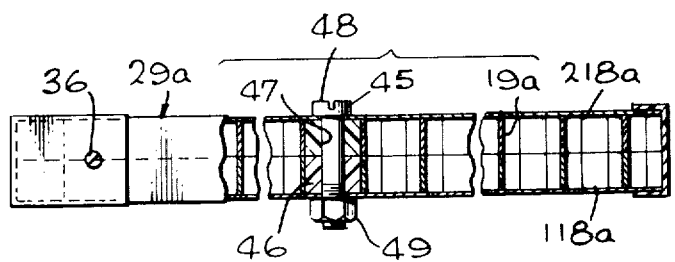
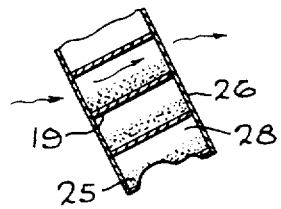

GAS SEPARATING DEVICE

BACKGROUND OF THE INVENTION

This invention relates to improved separating devices for removing one or more selected gases from a gas stream. The invention is in certain respects particularly useful for cleaning smog and other similar gaseous contaminants from air, and for clarity and simplicity will be described primarily as applied to that use, but without limiting the broader applicability of the invention to the cleaning of other gases if desired.

Most air cleaning filters heretofore devised which have utilized activated charcoal or the like have been relatively expensive to manufacture and maintain, and in may instances have been less effective in removing contaminants than would be desired. Additionally, many of these prior filters have been so constructed as to inherently introduce into the air circulation system an excessively high pressure drop, of a value limiting use of the filters to situations in which a very heavy blower mechanism was provided for moving air through the high resistance filter system.

SUMMARY OF THE INVENTION

The present invention provides an improved filter structure which is so constructed as to permit flow of air or another gas through the filter with very little restriction, in a manner introducing an extremely small pressure drop as the air passes through the filter. As a result, the filter may be utilized with air moving equipment of relatively low power without substantially reducing the rate of circulation produced by that equipment. For example, a filter embodying the invention may be designed for attachment to an ordinary room fan, and will filter the air being circulated by that fan without excessively reducing the rate of air movement produced thereby. At the same time, in spite of this low pressure drop characteristic, the filter nevertheless achieves a very effective filtering action, which over a relatively short period of time can remove substantially all contaminating gases and vapors from the air in a room. In spite of these operational advantages attained by the filter, the design of the filter is such as to allow its manufacture at an extremely low cost.

Structurally, the filter includes a body structure which is preferably of the honeycomb type and contains a large number of compartments through which air passes in flowing from the intake side of the filter to its exhaust side. The individual compartments contain granular material adapted to adsorb or react with a gas flowing therethrough, but with the individual compartments being only partially filled by that granular material. There are then left in the compartments, above the granular material, spaces which are open to relatively unrestricted flow of air therethrough, to thus attain the desired low pressure drop characteristics, but with the air being able to contact and be purified by the granular material in the compartments. The granular material is retained in the compartments by screening disposed across opposite ends of the compartments, and preferably taking the form of a net formed of nylon or the like.

In some forms of the invention, the compartmented body structure is formed of two honeycomb sections or the like, which may be manufactured separately or by cutting a single body of honeycomb into two layers. The granular material may be filled into one of these sections, following which the two sections are secured together in confronting relation to form together the desired compartments which are only partially filled with the granular material.

BRIEF DESCRIPTION OF THE DRAWING

The above and other features and objects of the invention will be better understood from the following detailed description of the typical embodiments illustrated in the accompanying drawing in which:

FIG. 4 is a perspective view of a portion of a variational form of filter during an early stage in its manufacture;

FIG. 5 shows the structure of FIG. 4 during a later state of manufacture;

FIG. 6 shows the filter of FIGS. 4 and 5 after completion;

FIG. 7 is a fragmentary perspective view showing the manner in which the outer frame element is locked on the filter;

FIG. 8 is a greatly enlarged fragmentary representation of another variational form of the invention; and FIG. 9 shows the manner in which a filter embodying the invention may be tilted to an inclined position in use, to optimize the positioning of the adsorbent particles.

DESCRIPTION OF THE PREFERRED EMBODIMENTS

Figure 1:
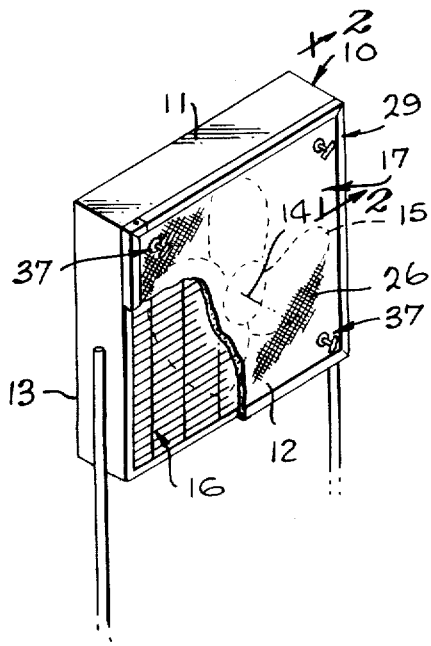
FIG. 1 is a perspective view of a room fan having attached thereto a filter constructed in accordance with the invention.

Referring first to FIG. 1, I have shown at 10 a conventional room fan typically having a housing or case 11 which is of square vertical section, and is open at its front side 12 and its rear side 13 for circulation of air forwardly therethrough along an axis 14 by the axial flow fan proper 15. The blades of the fan are driven rotatively about axis 14 by an appropriate electric motor or the like. At its front side, the housing 11 of the fan may carry a vertical grill 16, for preventing a user from touching the blades of the fan, while avoiding substantial obstruction of the air flow path. A similar grill may be provided at the rear side of the fan housing.

A filter 17 constructed in accordance with the present invention is disposed across the front side of the fan housing, and may be of the same square vertical cross-sectional shape as housing 11, to require flow of all of the air delivered forwardly by the fan through the filter. This filter includes a body structure 18 formed of a honeycomb type material (see FIGS. 2 and 3), defining a large number of parallel compartments or cells 19 extending in a front to rear direction through the entire thickness $t$ of the body structure 18, and therefore extending parallel to the air flow axis 14. The compartments 19 are defined by walls 20 of the honeycomb material, each of which preferably serves as a wall between two adjacent compartments. In most instances, it is preferred that the compartments 19 have the hexagonal cross-sectional configuration illustrated in FIG. 3, though it is contemplated that if desired the compartments may be of square cross-section or of any other convenient shape. The walls 20 terminate at their forward ends in edges 21 lying in a common plane 22 disposed transversely of axis 14, and similarly terminate at the rear face of the filter in edges 23 lying in a common plane 24 also disposed transversely of axis 14 and parallel to plane 22. As will be apparent, the various walls 20 are all preferably disposed perpendicular to these two front and rear planes 22 and 24, and the cells 19 therefore desirably have a uniform vertical cross-sectional configuration through the entire thickness $t$ of the honeycomb body structure 18.

Within each of the individual compartments 19, there is provided a mass of discrete particles or granules 25 of a material capable of adsorbing or reacting with selected gases in the circulating air, and especially high molecular weight gaseous components such as smog and other unwanted gases and vapors. Examples of materials which may be employed as the granules are activated charcoal (or other activated carbon), silica gel, alumina, or a molecular sieve. In the optimum arrangement, the particles are formed of activated charcoal formed from coconut shells, such as that sold by Barnebey-Cheney as activated charcoal Grade MI 1.

The particles or granules 25 are free for relative movement within their compartments 19, and are retained in the compartments by two air passing screens 26 and 27 lying in planes 22 and 24 respectively and disposed across the front and rear sides of the honeycomb material 18. Preferably, screens 26 and 27 are formed of flexible net material of relatively open weave, and typically formed of fibers of nylon or other flexible resinuous plastic material. The netting is secured in suitable manner to the front and rear edges 21 and 23 of the honeycomb material as by being permanently cemented to those edges 21 and 23 entirely about the periphery of the forward and rear ends of each of the individual compartments 19.

The individual openings formed in the net material 26 and 27 are of course smaller than the individual particles 25 of the granular filter material, to prevent loss of any of the particles through the net. In the currently preferred arrangement, the particles 25 are predominantly, and preferably substantially entirely, between about 6 and 10 mesh in size, optimally about 8 mesh, while the apertures in the netting 26 and 27 are between about three sixty-fourths and five sixty-fourths of an inch in maximum dimension, optimally about one-sixteenth of an inch.

The amount of granular material 25 which is present in each of the compartments 19 is purposely made insufficient to completely fill that compartment, so that the filter particles occupy only a lower portion of each compartment, and leave an upper portion 28 unoccupied to provide a relatively open air flow passage at that location through which air may flow through each compartment above the filter particles contained therein. In most instances, the granular material should fill only between about 25 and 60 percent of each of the individual compartments, preferably approximately 40 percent.

Figure 2:
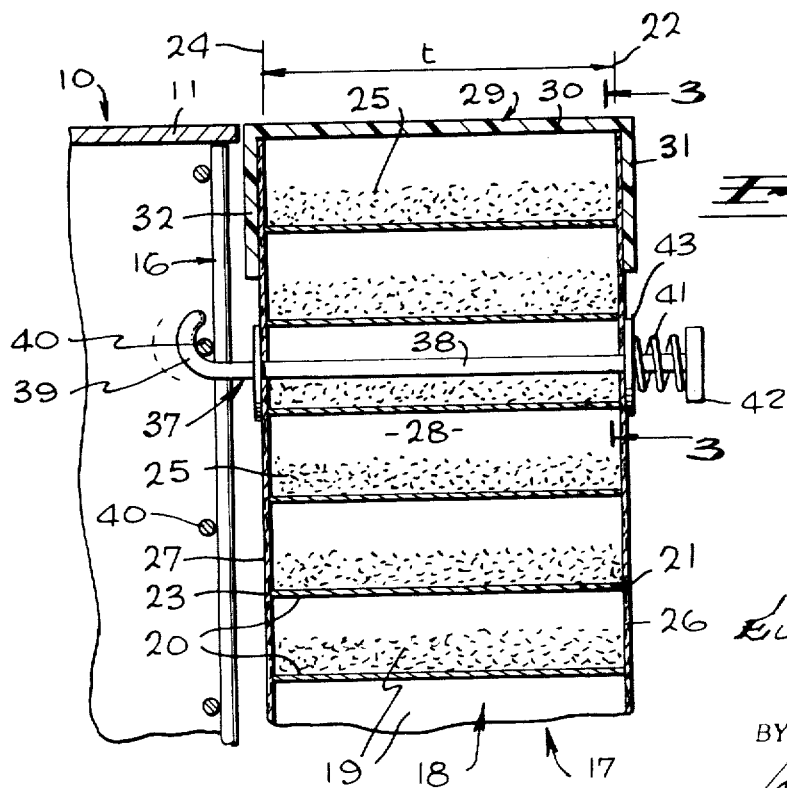
FIG. 2 is a greatly enlarged fragmentary vertical section taken on line 2—2 of FIG. 1.

The honeycomb body structure 18 is peripherally of square shape corresponding to that of square housing 11 of the fan structure 10, and may carry about its outer edge a frame element 29 having the U-shaped or channel shaped cross-section illustrated in the upper portion of FIG. 2. This frame may be formed of an extruded piece of fairly stiff resinous plastic material or the like, shaped to provide, in cross-section, a main web or cross-piece 30 and two parallel flanges 31 and 32. A single strip of this channel shaped material may extend entirely about the periphery of the honeycomb body structure, with web 30 of the frame element 29 being continuous along that entire extent, but with the flanges 31 being cut away at the four corners to form miter joints as illustrated at 33 in FIG. 7. The two ends of the strip 34 and 35 may slightly overlap one another (see FIG. 7), and may be secured together by a suitable fastener or other means, typically taking the form of a screw 36 extending through registering apertures in the two ends and connecting to a nut 37 carried by one of the ends.

For detachably connecting filter 17 to the front of fan 10, there may be provided suitable fasteners or brackets, such as the J-bolt or hook element illustrated at 37 in FIG. 2. Four such J-bolts may be provided near the four corners respectively of the filter and fan, with each J-bolt having a shank 38 extending through one of the compartments 19 of the honeycomb structure, and having a hook end 39 adapted to be received about one of the rods or elements 40 of grill 16 of the fan. The J-bolt may be spring urged forwardly and into holding engagement with the grill rod 40 by a spring 41 disposed about a forward portion of shank 38. An outer handle or control element 42 on the J-bolt may be utilized to press the J-bolt axially inwardly to the broken line position of FIG. 2, in which the hook 39 may be turned by handle 42 to a position enabling it to move forwardly past rod 40 for detachment of the filter from the fan. A washer 43 may be provided at the front of the filer element for spring 41 to bear against in actuating the J-bolt forwardly.

Figure 3:
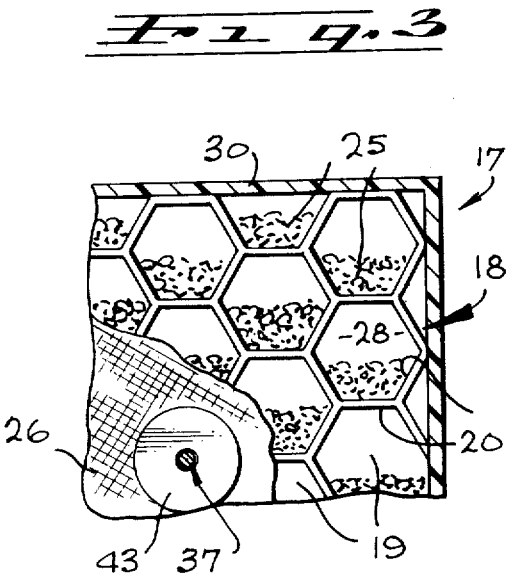
FIG. 3 is a fragmentary section taken on line 3—3 of FIG. 2.

In using the filter of FIGS. 1 to 3, a person may first attach the filter to the fan 10 very simply by merely moving the filter to the position illustrated in FIGS. 1 and 2 and then pressing J-bolts 37 inwardly and turning them to grasp onto corresponding ones of the grill rods 40 of the fan, and thereby hold the filter tightly against the front face of the fan. When the fan is then placed in operation, it blows air forwardly through all of the individual compartments 19 of the honeycomb structure, and past the granular material 25 in those compartments for adsorption of smog and other unwanted gaseous contaminants from the air. A large part of the air moves through the open upper portions 28 of the compartments, to thereby minimize the pressure drop across the filter, while some of the air passes through the individual masses granular material, and between the various particles. The movement of the air also agitates the particles to some extent, and may move them gradually to different positions for exposing different surface areas to the upper open spaces 28 in the various compartments. As the fan is kept in operation for a substantial period of time, such of the air is recirculated several times through the filter, with the result that the air in the entire room soon becomes substantially completely free of contamination, while at the same time a cooling circulation of air in large volume is continuously maintained.

FIGS. 4 to 6 illustrate the method of manufacture of a variational form of the invention. With reference first to FIG. 4, there is shown at 18a a body of honeycomb material which may be identical with that shown in FIGS. 1 to 3 at 18, and which may typically be formed of an appropriate cardboard or the like. In FIG. 4, the honeycomb material 18a may first have the two sheets of nylon or other netting 26a and 27a applied to its front and rear faces (corresponding to netting 26 and 27 of FIG. 2), and then may be cut in a plane 44 parallel to the planes of netting 26a and 27a to divide the honeycomb material into two sections 118a and 218a. After this cut is made, one of the sections may be placed on a horizontal support surface 45 as seen in FIG. 5, with its netting 26a at its underside, and granular adsorbent material such as that shown at 25 in FIG. 2 may be filled into all of the cells or compartments 19a of this section 118a up to the top of those cells. Next, the second section 218a may be reassembled with sections 118a in the original condition in which all of the cells and cell walls of one section meet and form continuations of the corresponding cells and cell walls of the other section. Since the cells or compartments in only one of the sections have initially been filled with granular material, the combined cells formed by the two sections together are only partially filled, to attain the results discussed in connection with the partially filled cells of FIGS. 2 and 3.

The two sections 118a and 218a may be secured together in any suitable manner, as by cementing together their mating edges, or more desirably by mechanical means allowing reseparation of the sections 118a and 218a at a later time for removal and replacement of the granular substance. In FIG. 6 two means of such mechanical connection are shown, one of which consists of utilizing an outer frame 29a such as that shown at 29 in FIGS. 1 to 3, and having a detachable fastener such as that shown at 36 in FIG. 7 for allowing removal of the frame whenever it is decided to separate the sections for removal and replacement of the filtering granules. A second method of connecting the two sections together, and one which may be used either separately or together with the frame 29a, consists of a bolt or screw 45 extending through corresponding cells of two sections 118a and 218a, with a rigid plastic material 46 preferably being filled into those two cells in the manner illustrated in FIG. 5, and being drilled to provide passages 47 through which the bolt 45 may extend. A head 48 of the bolt may then bear against the plastic material contained in one of the sections 218a, while a coacting nut 49 may bear against the plastic material contained within a cell of the other section 118a.

FIG. 8 shows another variational arrangement, which may be considered as similar to that of FIG. 6 except as to the manner of connection together of the two honeycomb sections 118b and 218b (corresponding to sections 118a and 218a of FIG. 6). In FIG. 8, it may be assumed that the two sections 118b and 218b are not initially formed as a single honeycomb part and then cut into two halves or sections, but rather are formed separately as reduced thickness honeycomb elements cut to an appropriate square or other peripheral shape. When thus formed separately, the honeycomb patterns of the two square layers 118b and 218b will not coincide exactly with one another, and therefore the cell defining walls 20b of one layer will not exactly meet corresponding cell defining walls 120b of the other layer. Utilizing this lack of exact pattern correspondence for securing the parts together, the two layers 118b and 218b are merely placed in superimposed relation as illustrated in FIG. 8, and then pressed together with sufficient force to cause the edges 21b of each layer to cut slightly into opposed portions of the edges 21b of the other layer, to thereby project into small notches 121b in the opposed edges, and be frictionally retained in those notches. It is found that if the honeycomb layers are formed of an appropriate cardboard material, a very effective interlocking between the two layers can be attained in this manner with no cement or mechanical connecting structure whatever. This can be supplemented by provision of the previously discussed frame element 29 or 29a. The granular material 25b may be filled into the lower of the two sections 118b and 218b before their interconnection, and in spite of the fact that the cells of the two layers do not exactly meet one another, it is found that the granular material will remain dispersed within the different compartments of the overall combined structure rather effectively in use. This is especially true if, as is preferred, the minimum particle size of the granular material is made fairly large, to minimize the movement of particles between different compartments and through the gaps left between non-mating edges of the two honeycomb layers.

If in any particular embodiment of the invention, the movement of the air through the individual honeycomb cells is rapid enough relative to the size and weight of the individual particles of the granular material, to tend to shift that material forwardly toward the front of the cells, this tendency may be overcome by tilting of the filter structure to a position such as that shown in FIG. 9. In that figure, it may be assumed that the fan induced flow of air is from left to right through cells 19, and therefore tends to move the granular material 25 rightwardly in a manner accumulating an excessive amount of the granular material adjacent front screen 26. The tilting of the unit introduces a counteracting tendency for the granular material to shift by gravity toward the backs of cells 19, with the degree of tilt being just sufficient to cause the two effects to exactly counteract one another, and result in maintenance of a uniform thickness of the granular material along the entire length of each cell.

While certain specific embodiments of the present invention have been disclosed as typical, the invention is of course not limited to these particular forms, but rather is applicable broadly to all such variations as fall within the scope of the appended claims. For example, variations of the discussed apparatus may be employed in any of various different types of low pressure drop gas treatment processes, for contacting a desired gas stream with a particular granular adsorbent or reactant substance, as for instance in removing oxygen from an air stream by contact with granular barium oxide at an elevated temperature.

I claim:

1. The combination comprising a gas separator to be disposed across a path of circulating air or other gas to remove one or more gases therefrom, and a plurality of J-fasteners carried by said separator and detachably connectible to the grill of a fan to secure the separator thereto, said separator including a body structure forming a large number of compartments through which the air or other gas flows along a large number of paths from an intake side of the separator to an exhaust side thereof, granular gas removing material contained in said compartments but only partially filling at least some of said compartments, and screening at opposite sides of said compartments retaining said granular material therein.

2. The combination comprising a gas separator to be disposed across a path of circulating air to remove one or more gases therefrom, an air circulating fan, and means securing said separator to said fan at a location across its air flow path, said separator including a body structure forming a large number of compartments through which the air flows along a large number of paths from an intake side of the separator to an exhaust side thereof, granular gas removing material contained in said compartments but only partially filling at least some of said compartments, and screening at opposite sides of said compartments retaining said granular material therein.

3. A gas separator to be disposed across a path of circular air or other gas to remove one or more gases therefrom, said separator including a body structure forming a large number of compartments through which the air or other gas flows along a large number of paths from an intake side of the separator to an exhaust side thereof, granular gas removing material contained in said compartments but only partially filling at least some of said compartments, and screening at opposite sides of said compartments retaining said granular material therein, said body structure including two honeycomb sections each containing a large number of cells and each forming a portion of the thickness of said body structure and positioned in confronting relation so that cells of one honeycomb section communicate with cells of the other to form together said compartments for passing air or other gas through both sections.

4. A gas separator as recited in claim 3, in which the patterns of cells of the two honeycomb sections are essentially identical so that each cell of one honeycomb section has boundaries coinciding substantially with boundaries of a corresponding cell of the other honeycomb section to form a continuation thereof.

5. A gas separator as recited in claim 3, in which the individual cells of one honeycomb section are not all directly opposite and patterned precisely the same as the cells of the other honeycomb section so that some cells of one section are opposite more than one cell of the other section.

6. A gas separator as recited in claim 3, in which said two honeycomb sections have edges which define the cells and some of which project into opposed edges of the other honeycomb section in a relation frictionally retaining said sections together.

7. A gas separator as recited in claim 6, including a channel frame extending about said honeycomb sections and retaining them together and detachable to enable separation of the sections.

8. A gas separator as recited in claim 3, including a channel frame extending about said honeycomb sections and retaining them together and detachable to enable separation of the sections.

9. A gas separator as recited in claim 8, in which said screening is formed of a net material cemented to said body structure about the ends of said compartments, there being a plurality of J-fasteners carried by said body structure near its periphery for detachably securing it to the grill of a fan, said sections having two opposed cells containing a solid material, and a threaded fastener extending through said solid material for detachably securing said sections together.

10. A gas separator as recited in claim 3, in which said sections have two opposed cells containing a solid material and a threaded fastener extending through said solid material for detachably securing said sections together.

11. A gas separator to be disposed across a path of circulating air or other gas to remove one or more gases therefrom; said separator including a body structure forming a large number of compartments through which the air or other gas flows along a large number of paths from an intake side of the separator to an exhaust side thereof; granular gas removing material contained in said compartments but only partially filling at least some of said compartments, in a relation leaving gas flow spaces within said compartments which are unoccupied by said granular material; said granular material being composed of movable masses of separate and discrete particles, which particles, by virtue of said only partial filling of the compartments, are free for bodily shifting movement within said compartments relative to one another by the movement of gas through said compartments; and screening at opposite sides of said compartments retaining said granular material therein.

12. A gas separator as recited in claim 11, in which said granular material fills a major portion of the individual compartments to between about 25 and 60 percent of their individual capacities.

13. A gas separator as recited in claim 11, in which said body structure is a honeycomb material.

14. A gas separator as recited in claim 11, in which said body structure is a cardboard honeycomb material.

15. A gas separator as recited in claim 11, in which said screening is formed of a net material.

16. A gas separator as recited in claim 11, in which said screening is formed of a net material cemented to said body structure about the ends of said compartments.

17. The combination comprising a gas separator as recited in claim 11, and fasteners for securing said gas separator to an air fan in its air flow path.

* * * * *